US007006636B2

(12) United States Patent
Baumgarte et al.

(10) Patent No.: US 7,006,636 B2

(45) Date of Patent: Feb. 28, 2006

(54) COHERENCE-BASED AUDIO CODING AND SYNTHESIS

(75) Inventors: Frank Baumgarte, North Plainfield, NJ (US); Christof Faller, Murray Hill, NJ (US)

(73) Assignee: Agere Systems Inc., Allentown, PA (US)

( * ) Notice: Subject to any disclaimer, the term of this patent is extended or adjusted under 35 U.S.C. 154(b) by 169 days.

(21) Appl. No.: 10/155,437

(22) Filed: May 24, 2002

(65) Prior Publication Data

US 2003/0219130 A1 Nov. 27, 2003

(51) Int. Cl.

*H04R 5/00* (2006.01)
*G06F 17/00* (2006.01)
*G10L 19/00* (2006.01)

(52) U.S. Cl. .............................. 381/17; 381/1; 700/94; 704/501

(58) Field of Classification Search .................... 381/1, 381/17, 19, 98, 103, 18, 10; 700/94; 704/200.1, 704/263, 500, 501, 205, 224

See application file for complete search history.

(56) References Cited

U.S. PATENT DOCUMENTS

| | | | | |
|---|---|---|---|---|
| 5,583,962 | A | 12/1996 | Davis et al. | 395/2.38 |
| 5,682,461 | A * | 10/1997 | Silzle et al. | 704/205 |
| 5,703,999 | A | 12/1997 | Herre et al. | 395/2.12 |
| 5,890,125 | A * | 3/1999 | Davis et al. | 704/501 |
| 5,930,733 | A * | 7/1999 | Park et al. | 381/17 |
| 6,236,731 | B1 * | 5/2001 | Brennan et al. | 381/316 |
| 6,473,733 | B1 * | 10/2002 | McArthur et al. | 704/224 |
| 6,763,115 | B1 | 7/2004 | Kobayashi | 381/309 |

FOREIGN PATENT DOCUMENTS

| | | | |
|---|---|---|---|
| EP | 1 376 538 | A1 | 1/2004 |
| WO | 03/090207 | AI | 10/2003 |

OTHER PUBLICATIONS

"3D Audio and Acoustic Environment Modeling" by William G. Gardner, HeadWize Technical Paper, Jan. 2001, pp. 1-11.

"Responding to One of Two Simultaneous Message", by Walter Spleth et al., The Journal of the Acoustical Society of America, vol. 26, No. 3, May 1954, pp. 391-396.

"A Speech Corpus for Multitalker Communications Research", by Robert S. Bolla, et al., J. Acoust. Soc., Am., vol. 107, No. 2, Feb. 2000, pp. 1065-1066.

"Synthesized Stereo Combined with Acoustic Echo Cancellation for Desktop Conferencing", by Jacob Benesty et al., Bell Labs Technical Journal, Jul.-Sep. 1998, pp. 148-158.

"The Role of Perceived Spatial Separation in the Unmasking of Speech", by Richard Freyman et al., J. Acoust. Soc., Am., vol. 106, No. 6, Dec. 1999, pp. 3578-3588.

"Binaural Cue Coding Applied to Stero and Multi-Channel Audio Compression," by Christof Faller et al., Audio Engineering Society $112_{th}$ Convention, Munich, Germany, vol. 112, No. 5574, May 10, 2002, pp. 1-9.

* cited by examiner

*Primary Examiner*—Sinh Tran
*Assistant Examiner*—Andrew Graham
(74) *Attorney, Agent, or Firm*—Steve Mendelsohn

(57) ABSTRACT

An auditory scene is synthesized from a mono audio signal by modifying, for each critical band, an auditory scene parameter (e.g., an inter-aural level difference (ILD) and/or an inter-aural time difference (ITD)) for each sub-band within the critical band, where the modification is based on an average estimated coherence for the critical band. The coherence-based modification produces auditory scenes having objects whose widths more accurately match the widths of the objects in the original input auditory scene.

39 Claims, 3 Drawing Sheets

COHERENCE-BASED AUDIO CODING AND SYNTHESIS

CROSS-REFERENCE TO RELATED APPLICATIONS

The subject matter of this application is related to the subject matter of U.S. patent application Ser. No. 09/848, 877, filed on May 4, 2001 as 5 ("the '877 application"), and U.S. patent application Ser. No. 10/045,458, filed on Nov. 7, 2001 as ("the '458 application"), the teachings of both of which are incorporated herein by reference.

BACKGROUND OF THE INVENTION

1. Field of the Invention

The present invention relates to the encoding of audio signals and the subsequent synthesis of auditory scenes from the encoded audio data.

2. Description of the Related Art

When a person hears an audio signal (i.e., sounds) generated by a particular audio source, the audio signal will typically arrive at the person's left and right ears at two different times and with two different audio (e.g., decibel) levels, where those different times and levels are functions of the differences in the paths through which the audio signal travels to reach the left and right ears, respectively. The person's brain interprets these differences in time and level to give the person the perception that the received audio signal is being generated by an audio source located at a particular position (e.g., direction and distance) relative to the person. An auditory scene is the net effect of a person simultaneously hearing audio signals generated by one or more different audio sources located at one or more different positions relative to the person.

The existence of this processing by the brain can be used to synthesize auditory scenes, where audio signals from one or more different audio sources are purposefully modified to generate left and right audio signals that give the perception that the different audio sources are located at different positions relative to the listener.

FIG. 1 shows a high-level block diagram of conventional binaural signal synthesizer 100, which converts a single audio source signal (e.g., a mono signal) into the left and right audio signals of a binaural signal, where a binaural signal is defined to be the two signals received at the eardrums of a listener. In addition to the audio source signal, synthesizer 100 receives a set of spatial cues corresponding to the desired position of the audio source relative to the listener. In typical implementations, the set of spatial cues comprises an interaural level difference (ILD) value (which identifies the difference in audio level between the left and right audio signals as received at the left and right ears, respectively) and an interaural time delay (ITD) value (which identifies the difference in time of arrival between the left and right audio signals as received at the left and right ears, respectively). In addition or as an alternative, some synthesis techniques involve the modeling of a direction-dependent transfer function for sound from the signal source to the eardrums, also referred to as the head-related transfer function (HRTF). See, e.g., J. Blauert, *The Psychophysics of Human Sound Localization*, MIT Press, 1983, the teachings of which are incorporated herein by reference.

Using binaural signal synthesizer 100 of FIG. 1, the mono audio signal generated by a single sound source can be processed such that, when listened to over headphones, the sound source is spatially placed by applying an appropriate set of spatial cues (e.g., ILD, ITD, and/or HRTF) to generate the audio signal for each ear. See, e.g., D. R. Begault, *3-D Sound for Virtual Reality and Multimedia*, Academic Press, Cambridge, Mass., 1994.

Binaural signal synthesizer 100 of FIG. 1 generates the simplest type of auditory scenes: those having a single audio source positioned relative to the listener. More complex auditory scenes comprising two or more audio sources located at different positions relative to the listener can be generated using an auditory scene synthesizer that is essentially implemented using multiple instances of binaural signal synthesizer, where each binaural signal synthesizer instance generates the binaural signal corresponding to a different audio source. Since each different audio source has a different location relative to the listener, a different set of spatial cues is used to generate the binaural audio signal for each different audio source.

FIG. 2 shows a high-level block diagram of conventional auditory scene synthesizer 200, which converts a plurality of audio source signals (e.g., a plurality of mono signals) into the left and right audio signals of a single combined binaural signal, using a different set of spatial cues for each different audio source. The left audio signals are then combined (e.g., by simple addition) to generate the left audio signal for the resulting auditory scene, and similarly for the right.

One of the applications for auditory scene synthesis is in conferencing. Assume, for example, a desktop conference with multiple participants, each of whom is sitting in front of his or her own personal computer (PC) in a different city. In addition to a PC monitor, each participant's PC is equipped with (1) a microphone that generates a mono audio source signal corresponding to that participant's contribution to the audio portion of the conference and (2) a set of headphones for playing that audio portion. Displayed on each participant's PC monitor is the image of a conference table as viewed from the perspective of a person sitting at one end of the table. Displayed at different locations around the table are real-time video images of the other conference participants.

In a conventional mono conferencing system, a server combines the mono signals from all of the participants into a single combined mono signal that is transmitted back to each participant. In order to make more realistic the perception for each participant that he or she is sitting around an actual conference table in a room with the other participants, the server can implement an auditory scene synthesizer, such as synthesizer 200 of FIG. 2, that applies an appropriate set of spatial cues to the mono audio signal from each different participant and then combines the different left and right audio signals to generate left and right audio signals of a single combined binaural signal for the auditory scene. The left and right audio signals for this combined binaural signal are then transmitted to each participant. One of the problems with such conventional stereo conferencing systems relates to transmission bandwidth, since the server has to transmit a left audio signal and a right audio signal to each conference participant.

SUMMARY OF THE INVENTION

The '877 and '458 applications describe techniques for synthesizing auditory scenes that address the transmission bandwidth problem of the prior art. According to the '877 application, an auditory scene corresponding to multiple audio sources located at different positions relative to the listener is synthesized from a single combined (e.g., mono) audio signal using two or more different sets of auditory scene parameters (e.g., spatial cues such as an interaural level difference (ILD) value, an interaural time delay (ITD) value, and/or a head-related transfer function (HRTF)). As such, in the case of the PC-based conference described previously, a solution can be implemented in which each participant's PC receives only a single mono audio signal corresponding to a combination of the mono audio source signals from all of the participants (plus the different sets of auditory scene parameters).

The technique described in the '877 application is based on an assumption that, for those frequency bands in which the energy of the source signal from a particular audio source dominates the energies of all other source signals in the mono audio signal, from the perspective of the perception by the listener, the mono audio signal can be treated as if it corresponded solely to that particular audio source. According to implementations of this technique, the different sets of auditory scene parameters (each corresponding to a particular audio source) are applied to different frequency bands in the mono audio signal to synthesize an auditory scene.

The technique described in the '877 application generates an auditory scene from a mono audio signal and two or more different sets of auditory scene parameters. The '877 application describes how the mono audio signal and its corresponding sets of auditory scene parameters are generated. The technique for generating the mono audio signal and its corresponding sets of auditory scene parameters is referred to in this specification as binaural cue coding (BCC). The BCC technique is the same as the perceptual coding of spatial cues (PCSC) technique referred to in the '877 and '458 applications.

According to the '458 application, the BCC technique is applied to generate a combined (e.g., mono) audio signal in which the different sets of auditory scene parameters are embedded in the combined audio signal in such a way that the resulting BCC signal can be processed by either a BCC-based receiver or a conventional (i.e., legacy or non-BCC) receiver. When processed by a BCC-based receiver, the BCC-based receiver extracts the embedded auditory scene parameters and applies the auditory scene synthesis technique of the '877 application to generate a binaural (or higher) signal. The auditory scene parameters are embedded in the BCC signal in such a way as to be transparent to a conventional receiver, which processes the BCC signal as if it were a conventional (e.g., mono) audio signal. In this way, the technique described in the '458 application supports the BCC processing of the '877 application by BCC-based receivers, while providing backwards compatibility to enable BCC signals to be processed by conventional receivers in a conventional manner.

The BCC techniques described in the '877 and '458 applications effectively reduce transmission bandwidth requirements by converting, at a transmitter, a binaural input signal (e.g., left and right audio channels) into a single mono audio channel and a stream of binaural cue coding (BCC) parameters transmitted (either in-band or out-of-band) in parallel with the mono signal. For example, a mono signal can be transmitted with approximately 50–80% of the bit rate otherwise needed for a corresponding two-channel stereo signal. The additional bit rate for the BCC parameters is only a few kbits/sec (i.e., more than an order of magnitude less than an encoded audio channel). At the receiver, left and right channels of a binaural signal are synthesized from the received mono signal and BCC parameters.

The coherence of a binaural signal is related to the perceived width of the audio source. The wider the audio source, the lower the coherence between the left and right channels of the resulting binaural signal. For example, the coherence of the binaural signal corresponding to an orchestra spread out over an auditorium stage is typically lower than the coherence of the binaural signal corresponding to a single violin playing solo. In general, an audio signal with lower coherence is usually perceived as more spread out in auditory space.

The BCC techniques of the '877 and '458 applications generate binaural signals in which the coherence between the left and right channels approaches the maximum possible value of 1. If the original binaural input signal has less than the maximum coherence, the receiver will not recreate a stereo signal with the same coherence. This results in auditory image errors, mostly by generating too narrow images, which produces a too "dry" acoustic impression.

In particular, the left and right output channels will have a high coherence, since they are generated from the same mono signal by slowly-varying level modifications in auditory critical bands. A critical band model, which divides the auditory range into a discrete number of audio bands, is used in psychoacoustics to explain the spectral integration of the auditory system. For headphone playback, the left and right output channels are the left and right ear input signals, respectively. If the ear signals have a high coherence, then the auditory objects contained in the signals will be perceived as very "localized" and they will have only a very small spread in the auditory spatial image. For loudspeaker playback, the loudspeaker signals only indirectly determine the ear signals, since cross-talk from the left loudspeaker to the right ear and from the right loudspeaker to the left ear has to be taken into account. Moreover, room reflections can also play a significant role for the perceived auditory image. However, for loudspeaker playback, the auditory image of highly coherent signals is very narrow and localized, similar to headphone playback.

According to embodiments of the present invention, the BCC techniques of the '877 and '458 applications are extended to include BCC parameters that are based on the coherence of the input audio signals. The coherence parameters are transmitted from the transmitter to a receiver along with the other BCC parameters in parallel with the encoded mono audio signal. The receiver applies the coherence parameters in combination with the other BCC parameters to synthesize an auditory scene (e.g., the left and right channels of a binaural signal) with auditory objects whose perceived widths more accurately match the widths of the auditory objects that generated the original audio signals input to the transmitter.

A problem related to the narrow image width of auditory objects generated by the BCC techniques of the '877 and '458 applications is the sensitivity to inaccurate estimates of the auditory spatial cues (i.e., the BCC parameters). Especially with headphone playback, auditory objects that should be at a stable position in space tend to move randomly. The perception of objects that unintentionally move around can be annoying and substantially degrade the perceived audio quality. This problem substantially if not completely disappears, when embodiments of the present invention are applied.

In one embodiment, the present invention is a method and apparatus for processing two or more input audio signals, as well as the bitstream resulting from that processing. According to this embodiment, M input audio signals are converted from a time domain into a frequency domain, where $M>1$. A set of one or more auditory scene parameters is generated for each of one or more different frequency bands in the M converted input audio signals, where each set of one or more auditory scene parameters comprises an estimate of coherence between the M input audio signals. The M input audio signals are combined to generate N combined audio signals, where M>N.

In another embodiment, the present invention is a method and apparatus for synthesizing an auditory scene. According to this embodiment, an input audio signal is divided into one or more frequency bands, wherein each band comprises a plurality of sub-bands. An auditory scene parameter is applied to each band to generate two or more output audio signals, wherein the auditory scene parameter is modified for each different sub-band in the band based on a coherence value.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
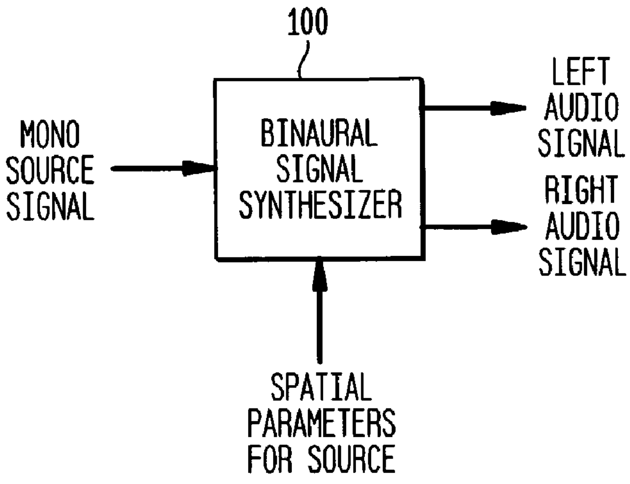
FIG. 1 (PRIOR ART)
FIG. 1 shows a high-level block diagram of conventional binaural signal synthesizer that converts a single audio source signal (e.g., a mono signal) into the left and right audio signals of a binaural signal.
Figure 2:
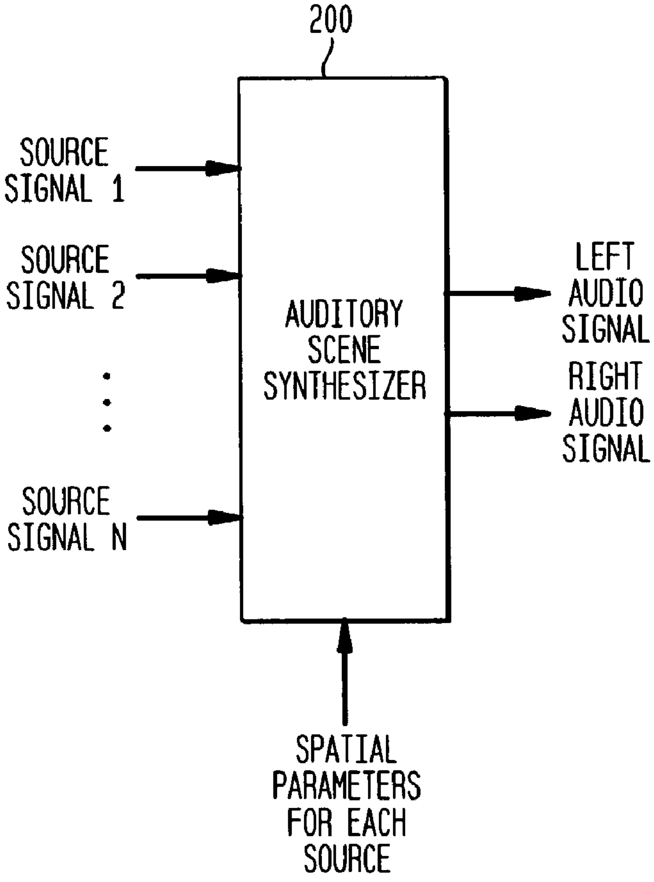
FIG. 2 (PRIOR ART)
FIG. 2 shows a high-level block diagram of conventional auditory scene synthesizer that converts a plurality of audio source signals (e.g., a plurality of mono signals) into the left and right audio signals of a single combined binaural signal.
Figure 3:
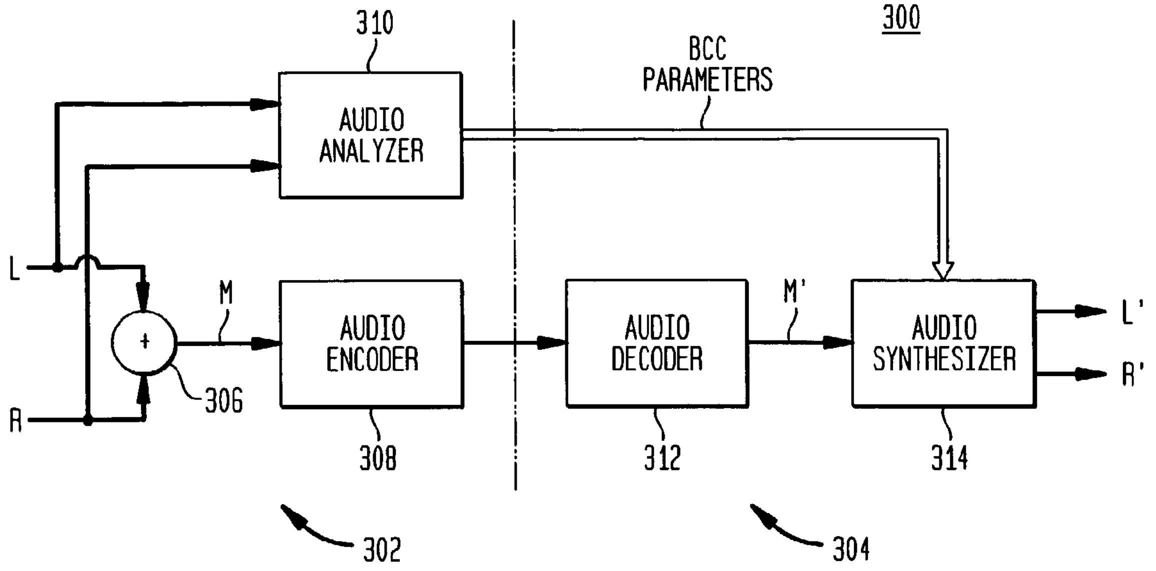
FIG. 3 shows a block diagram of an audio processing system, according to one embodiment of the present invention.

FIG. 3 shows a block diagram of an audio processing system 300 comprising a transmitter 302 and a receiver 304, according to one embodiment of the present invention. Transmitter 302 converts the left and right channels (L, R) of an input binaural signal into an encoded mono audio signal and a stream of corresponding binaural cue coding (BCC) parameters. Transmitter 302 transmits the BCC parameters (either in-band or out-of-band, depending on the particular implementation) in parallel with the encoded mono audio signal to receiver 304, which decodes the encoded mono audio signal and applies the recovered BCC parameters to generate the left and right channels (L', R') of an output binaural signal corresponding to a synthesized auditory scene.

In particular, summation node 306 of transmitter 302 down-mixes (e.g., averages) the left and right input channels (L, R) to generate a combined mono audio signal M that is then encoded by a suitable audio encoder 308 to generate a bitstream of encoded mono audio data that is transmitted to receiver 304. In addition, audio analyzer 310 analyzes the left and right input signals (L, R) to generate the stream of BCC parameters that is also transmitted to receiver 304.

Audio decoder 312 of receiver 304 decodes the received encoded mono audio bitstream to generate a decoded mono audio signal M', and audio synthesizer 314 applies the recovered BCC parameters to the decoded mono audio signal M' to generate the left and right channels (L', R') of the output binaural signal.

In preferred implementations, audio analyzer 310 performs band-based processing analogous to that described in the '877 and '458 applications to generate one or more different spatial cues for each of one or more frequency bands of the audio input signals. In the present invention, however, in addition to spatial cues corresponding to the inter-aural level difference (ILD), inter-aural time difference (ITD), and/or head-related transfer function (HRTF), audio analyzer 310 also generates coherence measures for each frequency band.

Coherence Estimation

Figure 4:
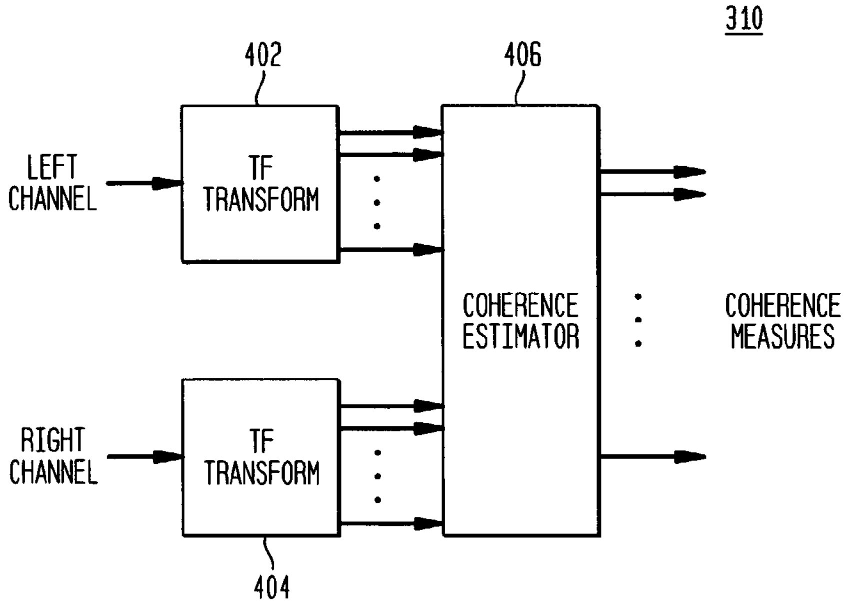
FIG. 4 shows a block diagram of that portion of the processing of the audio analyzer of FIG. 3 corresponding to the generation of coherence measures, according to one embodiment of the present invention.

FIG. 4 shows a block diagram of that portion of the processing of audio analyzer 310 of FIG. 3 corresponding to the generation of coherence measures, according to one embodiment of the present invention. As shown in FIG. 4, audio analyzer 310 comprises two time-frequency (TF) transform blocks 402 and 404, which apply a suitable transform, such as a short-time discrete Fourier transform (DFT) of length 1024, to convert the left and right input audio signals L and R, respectively, from the time domain into the frequency domain. Each transform block generates a number of outputs corresponding to different frequency sub-bands of the input audio signals. Coherence estimator 406 characterizes the coherence of each of the different sub-bands and averages those coherence measures within different groups of adjacent sub-bands corresponding to different critical bands. Those skilled in the art will appreciate that, in preferred implementations, the number of sub-bands varies from critical band to critical band with lower-frequency critical bands have fewer sub-bands than higher-frequency critical bands.

In one implementation, the coherence of each sub-band is estimated using the short-time DFT spectra. The real and imaginary parts of the spectral component $K_L$ of the left channel DFT spectrum may be denoted $Re\{K_L\}$ and $Im\{K_L\}$, respectively, and analogously for the right channel. In that case, the power estimates $P_{LL}$ and $P_{RR}$ for the left and right channels may be represented by Equations (1) and (2), respectively, as follows:

$$P_{LL}=(1-\alpha)P_{LL}+\alpha(Re^2\{K_L\}+Im^2\{K_L\}) \quad (1)$$

$$P_{RR}=(1-\alpha)P_{RR}+\alpha(Re^2\{K_R\}+Im^2\{K_R\}) \quad (2)$$

The real and imaginary cross terms $P_{LR,Re}$ and $P_{LR,Im}$ are given by Equations (3) and (4), respectively, as follows:

$$P_{LR,Re}=(1-\alpha)P_{LR}+\alpha(Re\{K_L\}Re\{K_R\}+Im\{K_L\}Im\{K_R\}) \quad (3)$$

$$P_{LR,Im}=(1-\alpha)P_{LR}-\alpha(Re\{K_L\}Im\{K_R\}+Im\{K_L\}Re\{K_R\}) \quad (4)$$

The factor α determines the estimation window duration and can be chosen as α=0.1 for an audio sampling rate of 32 kHz and a frame shift of 512 samples. As derived from Equations (1)–(4), the coherence estimate γ for a sub-band is given by Equation (5) as follows:

$$\gamma=(P_{LR,Re}^2+P_{LR,Im}^2)/(P_{LL}P_{RR}) \quad (5)$$

As mentioned previously, coherence estimator 406 averages the sub-band coherence estimates γ over each critical band. For that averaging, a weighting function is preferably applied to the sub-band coherence estimates before averaging. The weighting can be made proportional to the power estimates given by Equations (1) and (2). For one critical band p, which contains the spectral components n1, n1+1, . . . , n2, the averaged weighted coherence $\bar{\gamma}_p$ may be calculated using Equation (6) as follows:

$$\bar{\gamma}_P = \sum_{n=n1}^{n2} (P_{LR,Re}^2(n) + P_{LR,Im}^2(n)) \Big/ \sum_{n=n1}^{n2} (P_{LL}(n)P_{RR}(n)) \qquad (6)$$

In one possible implementation of transmitter 302 of FIG. 3, it is the averaged weighted coherence estimates $\bar{\gamma}_p$ for the different critical bands that are generated by audio analyzer 310 for inclusion in the BCC parameter stream transmitted to receiver 304.

Coherence-Based Audio Synthesis

Figure 5:
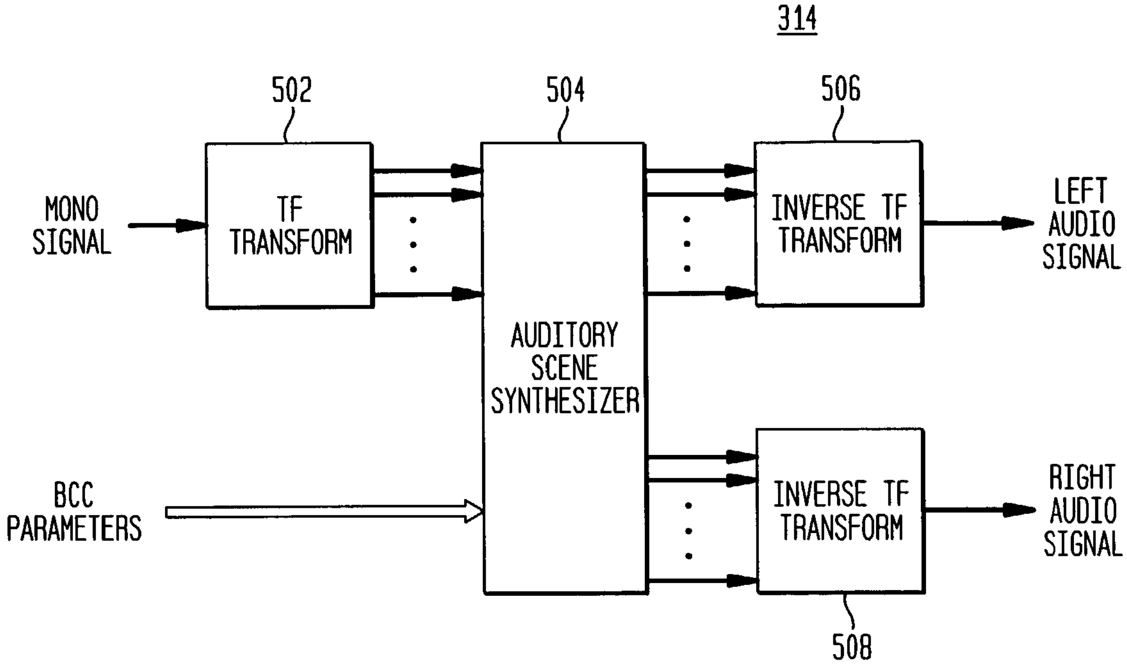
FIG. 5 shows a block diagram of the audio processing performed by the audio synthesizer of FIG. 3.

FIG. 5 shows a block diagram of the audio processing performed by audio synthesizer 314 to convert the decoded mono audio signal M' generated by audio decoder 312 and the corresponding BCC parameters received from transmitter 302 into the left and right channels (L', R') of the binaural signal for a synthesized auditory scene.

In particular, time-frequency (TF) transform 502 converts each frame of the mono signal M' into the frequency domain. For each frequency sub-band, auditory scene synthesizer 504 applies the corresponding BCC parameters to the converted combined signal to generate left and right audio signals for that frequency band in the frequency domain. In particular, for each audio frame and for each frequency sub-band, synthesizer 504 applies the corresponding set of spatial cues. Inverse TF transforms 506 and 508 are then applied to generate the left and right time-domain audio signals, respectively, of the binaural signal corresponding to the synthesized auditory scene.

According to the audio synthesis processing described in the '877 and '458 applications, prior to the frequency components being applied to inverse TF transforms 506 and 508, weighting factors $w_L$ and $w_R$ are applied to the left and right frequency components, respectively, in each sub-band in order to move the corresponding auditory object left or right in the synthesized auditory scene. In order to maintain constant audio signal energy, the weighting factors are preferably selected such that Equation (7) applies as follows:

$$w_L^2+w_R^2=1. \qquad (7)$$

In the audio synthesis processing of the '877 and '458 applications, the same weighting factors are applied to all of the sub-bands within a single critical band. The weighting factors may change from critical band to critical band, but, within each critical band, the same weighting factors are applied to each sub-band. In general, an object with dominant frequency components in a particular critical band will be localized at the right side if $w_L<w_R$ and, at the left side, if $w_L>w_R$.

If a stereo signal contains one auditory object, the perceptual similarity of L' and R' determines the spatial image width of that object. This similarity is often physically described by the cross-correlation or coherence function. A perceptually meaningful way to reduce the perceptual similarity is to modify the weighting factors $w_L$ and $w_R$ that are applied to different sub-bands within each critical band. In one implementation, the modification involves multiplying the weighting factors of all sub-bands with a pseudo-random sequence, e.g., integers (including zero) ranging between ±5 or ±6. The pseudo-random sequence is preferably chosen such that the variance is approximately constant for all critical bands, and the average is zero within each critical band. The same sequence is applied to the spectral coefficients of each different frame.

The auditory image width is controlled by modifying the variance of the pseudo-random sequence. A larger variance creates a larger image width. The variance modification can be performed in individual bands that are critical-band wide. This enables simultaneous multiple objects in an auditory scene with different image widths. A suitable amplitude distribution for the pseudo-random sequence is a uniform distribution on a logarithmic scale.

In preferred implementations of the present invention, the weighting factors $w_L$ and $w_R$ used in the audio synthesis processing of the '877 and '458 applications are modified as follows. As shown in the following Equation (8), the weighting factors $w_L$ and $w_R$ are multiplied by the factors $n_L$ and $n_R$, respectively, to derive modified weighting factors $w_1$' and $w_R$' that are then applied to the left and right spectral coefficients of each sub-band.

$$w_L'=w_L n_L;\ w_R'=w_R n_R \qquad (8)$$

The factors $n_L$ and $n_R$ are derived from the relations of Equations (9) and (10) as follows:

$$\frac{n_L}{n_R} = 10^{\frac{g r_{dB}}{20}} \qquad (9)$$

$$(w_L n_L)^2+(w_R n_R)^2=1 \qquad (10)$$

where $r_{dB}$ is the corresponding value in the zero-mean, uniform-distributed random sequence and g is a gain value that controls the perceived image width.

In preferred implementations, the gain g is controlled based on the estimated coherence of the left and right channels. For a smaller coherence, the gain g should be properly mapped as a suitable function f(γ) of the coherence γ. In general, if the coherence is large (e.g., approaching the maximum possible value of +1), then the object in the input auditory scene is narrow. In that case, the gain g should be small (e.g., approaching the minimum possible value of 0) so that the factors $n_L$ and $n_R$ are both close to 1 in order to leave the weighting factors $w_L$ and $w_R$ substantially unchanged. On the other hand, if the coherence is small (e.g., approaching the minimum possible value of −1), then the object in the input auditory scene is wide. In that case, the gain g should be large so that the factors $n_L$ and $n_R$ are different in order to modify the weighting factors $w_L$ and $w_R$ significantly.

A suitable mapping function f(γ) for the gain g for a particular critical band is given by Equation (11) as follows:

$$g=5(1-\bar{\gamma}) \qquad (11)$$

where $\bar{\gamma}$ is the estimated coherence for the corresponding critical band that is transmitted to receiver 304 of FIG. 3 as part of the stream of BCC parameters. According to this linear mapping function, the gain g is 0 when the estimated coherence $\bar{\gamma}$ is 1, and g=10, when $\bar{\gamma}$=−1. In alternative embodiments, the gain g may be a non-linear function of coherence.

Although the present invention has been described in the context of modifying the weighting factors $w_L$ and $w_R$ based on a pseudo-random sequence, the present invention is not so limited. In general, the present invention applies to any modification of perceptual spatial cues between sub-bands of a larger (e.g., critical) band. The modification function is not limited to random sequences. For example, the modification function could be based on a sinusoidal function, where the values for $r_{dB}$ in Equation (9) correspond to the values of a sine wave. In some implementations, the period of the sine wave varies from critical band to critical band as a function of the width of the corresponding critical band (e.g., with one or more full periods of the corresponding sine wave within each critical band). In other implementations, the period of the sine wave is constant over the entire frequency range. In both of these implementations, the sinusoidal modification function is preferably contiguous between critical bands.

Another example of a modification function is a sawtooth or triangular function that ramps up and down linearly between a positive maximum value and a corresponding negative minimum value. Here, too, depending on the implementation, the period of the modification function may vary from critical band to critical band or be constant across the entire frequency range, but, in any case, is preferably contiguous between critical bands.

Although the present invention has been described in the context of random, sinusoidal, and triangular functions, other functions that modify the weighting factors within each critical band are also possible. Like the sinusoidal and triangular functions, these other modification functions may be, but do not have to be, contiguous between critical bands.

According to the embodiments of the present invention described above, spatial rendering capability is achieved by introducing modified level differences between sub-bands within critical bands of the audio signal. Alternatively or in addition, the present invention can be applied to modify time differences as valid perceptual spatial cues. In particular, a technique to create a wider spatial image of an auditory object similar to that described above for level differences can be applied to time differences, as follows.

As defined in the '877 and '458 applications, the time difference in sub-band s between two audio channels is denoted $\tau_s$. According to certain implementations of the present invention, a delay offset $d_s$ and a gain factor $g_c$ can be introduced to generate a modified time difference $\tau_s'$ for sub-band s according to Equation (12) as follows.

$$\tau_s' = g_c d_s + \tau_s \tag{12}$$

The delay offset $d_s$ is preferably constant over time for each sub-band, but varies between sub-bands and can be chosen as a zero-mean random sequence or a smoother function that preferably has a mean value of zero in each critical band. As with the gain factor g in Equation (9), the same gain factor $g_c$ is applied to all sub-bands n that fall inside each critical band c, but the gain factor can vary from critical band to critical band. The gain factor $g_c$ is derived from the coherence estimate using a mapping function that is preferably proportional to linear mapping function of Equation (11). As such, $g_c = ag$, where the value of constant a is determined by experimental tuning. In alternative embodiments, the gain $g_c$ may be a non-linear function of coherence. Auditory scene synthesizer 504 applies the modified time differences $\tau_s'$ instead of the original time differences $\tau_s$. To increase the image width of an auditory object, both level-difference and time-difference modifications can be applied.

Although the interface between transmitter 302 and receiver 304 in FIG. 3 has been described in the context of a transmission channel, those skilled in the art will understand that, in addition or in the alternative, that interface may include a storage medium. Depending on the particular implementation, the transmission channels may be wired or wire-less and can use customized or standardized protocols (e.g., IP). Media like CD, DVD, digital tape recorders, and solid-state memories can be used for storage. In addition, transmission and/or storage may, but need not, include channel coding. Similarly, although the present invention has been described in the context of digital audio systems, those skilled in the art will understand that the present invention can also be implemented in the context of analog audio systems, such as AM radio, FM radio, and the audio portion of analog television broadcasting, each of which supports the inclusion of an additional in-band low-bitrate transmission channel.

The present invention can be implemented for many different applications, such as music reproduction, broadcasting, and telephony. For example, the present invention can be implemented for digital radio/TV/internet (e.g., Webcast) broadcasting such as SIRIUS SATELLITE RADIO or XM broadcasting. Other applications include voice over IP, PSTN or other voice networks, analog radio broadcasting, and Internet radio.

Depending on the particular application, different techniques can be employed to embed the sets of BCC parameters into the mono audio signal to achieve a BCC signal of the present invention. The availability of any particular technique may depend, at least in part, on the particular transmission/storage medium(s) used for the BCC signal. For example, the protocols for digital radio broadcasting usually support inclusion of additional "enhancement" bits (e.g., in the header portion of data packets) that are ignored by conventional receivers. These additional bits can be used to represent the sets of auditory scene parameters to provide a BCC signal. In general, the present invention can be implemented using any suitable technique for watermarking of audio signals in which data corresponding to the sets of auditory scene parameters are embedded into the audio signal to form a BCC signal. For example, these techniques can involve data hiding under perceptual masking curves or data hiding in pseudo-random noise. The pseudo-random noise can be perceived as "comfort noise." Data embedding can also be implemented using methods similar to "bit robbing" used in TDM (time division multiplexing) transmission for in-band signaling. Another possible technique is mu-law LSB bit flipping, where the least significant bits are used to transmit data.

The transmitter of the present invention has been described in the context of converting the left and right audio channels of a binaural signal into an encoded mono signal and a corresponding stream of BCC parameters. Similarly, the receiver of the present invention has been described in the context of generating the left and right audio channels of a synthesized binaural signal based on the encoded mono signal and the corresponding stream of BCC parameters. The present invention, however, is not so limited. In general, transmitters of the present invention may be implemented in the context of converting M input audio channels into N combined audio channels and one or more corresponding sets of BCC parameters, where M>N. Similarly, receivers of the present invention may be implemented in the context of generating P output audio channels from the N combined audio channels and the corresponding sets of BCC parameters, where P>N, and P may be the same as or different from M.

Although the present invention has been described in the context of transmission/storage of a mono audio signal with embedded auditory scene parameters, the present invention can also be implemented for other numbers of channels. For example, the present invention may be used to transmit a two-channel audio signal with embedded auditory scene parameters, which audio signal can be played back with a conventional two-channel stereo receiver. In this case, a BCC receiver can extract and use the auditory scene parameters to synthesize a surround sound (e.g., based on the 5.1 format). In general, the present invention can be used to generate M audio channels from N audio channels with embedded auditory scene parameters, where M>N.

Although the present invention has been described in the context of receivers that apply the techniques of the '877 and '458 applications to synthesize auditory scenes, the present invention can also be implemented in the context of receivers that apply other techniques for synthesizing auditory scenes that do not necessarily rely on the techniques of the '877 and '458 applications.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method for processing two or more input audio signals, comprising the steps of:

(a) converting M input audio signals from a time domain into a frequency domain, where M>1;

(b) generating a set of one or more auditory scene parameters for each of one or more different frequency bands in the M converted input audio signals, where each set of one or more auditory scene parameters comprises information corresponding to an estimate of coherence between the M input audio signals, wherein the estimate of coherence is related to perceived width of an audio source corresponding to the M input audio signals;

(c) combining the M input audio signals to generate N combined audio signals, where M>N; and (d) transmitting the information corresponding to the estimate of coherence along with the N combined audio signals.

2. The invention of claim 1, wherein:

step (a) comprises the step of applying a discrete Fourier transform (DFT) to convert left and right audio signals of an input audio signal from the time domain into a plurality of sub-bands in the frequency domain;

step (b) comprises the steps of:

(1) generating an estimated coherence between the left and right audio signals for each sub-band; and (2) generating an average estimated coherence for one or more critical bands, wherein each critical band comprises a plurality of sub-bands; and step (c) comprises the steps of:

(1) combining the left and right audio signals into a single mono signal; and (2) encoding the single mono signal to generate an encoded mono signal bitstream.

3. The invention of claim 2, wherein the average estimated coherence for each critical band is encoded into the encoded mono signal bitstream.

4. The invention of claim 1, wherein the auditory scene parameters further comprise one or more of an inter-aural level difference (ILD), an inter-aural time difference (ITD), and a head-related transfer function (HRTF).

5. The invention of claim 1, wherein the estimate of coherence is a function of power estimates for the M input audio signals.

6. The invention of claim 1, wherein the auditory scene parameters are transmitted along with the N combined audio signals to an apparatus adapted to synthesize an auditory scene from the N combined audio signals and the auditory scene parameters.

7. An apparatus for processing two or more input audio signals, comprising:

(a) an audio analyzer comprising:

(1) one or more time-frequency transformers configured to convert M input audio signals from a time domain into a frequency domain, where M>1; and (2) a coherence estimator configured to generate a set of one or more auditory scene parameters for each of one or more different frequency bands in the M converted input audio signals, where each set of one or more auditory scene parameters comprises information corresponding to an estimate of coherence between the M input audio signals, wherein the estimate of coherence is related to perceived width of an audio source corresponding to the M input audio signals; and (b) a combiner configured to combine the M input audio signals to generate N combined audio signals, where M>N, and transmit the information corresponding to the estimate of coherence along with the N combined audio signals.

8. The invention of claim 7, wherein the apparatus is adapted to transmit the auditory scene parameters along with the N combined audio signals to an apparatus adapted to synthesize an auditory scene from the N combined audio signals and the auditory scene parameters.

9. An encoded audio bitstream generated by:

(a) converting M input audio signals from a time domain into a frequency domain, where M>1;

(b) generating a set of one or more auditory scene parameters for each of one or more different frequency bands in the M converted input audio signals, where each set of one or more auditory scene parameters comprises information corresponding to an estimate of coherence between the M input audio signals, wherein the estimate of coherence is related to perceived width of an audio source corresponding to the M input audio signals;

(c) combining the M input audio signals to generate N combined audio signals of the encoded audio bitstream, where M>N; and (d) encoding the information corresponding to the estimate of coherence into the encoded audio bitstream.

10. A method for synthesizing an auditory scene, comprising the steps of:

(a) dividing an input audio signal into one or more frequency bands, wherein each band comprises a plurality of sub-bands; and (b) applying an auditory scene parameter to each band to generate two or more output audio signals, wherein the auditory scene parameter is modified for each different sub-band in the band based on a coherence value, wherein the coherence value is related to perceived width of a synthesized audio source corresponding to the two or more output audio signals.

11. The invention of claim 10, wherein the auditory scene parameter is a level difference.

12. The invention of claim 11, wherein, for each sub-band in each band, the level difference corresponds to left and right weighting factors $w_L$ and $w_R$ that are modified by factors $n_L$ and $n_R$, respectively, to generate left and right modified weighting factors $w_L'$ and $w_R'$ that are used to generate left and right audio signals of an output audio signal, wherein:

$$w_L' = w_L n_L;\; w_R' = w_R n_R$$

$$\frac{n_L}{n_R} = 10^{\frac{g r_{dB}}{20}}$$

$$(w_L n_L)^2+(w_R n_R)^2=1$$

where g is a gain value for the corresponding band and $r_{dB}$ is a modification function value for the corresponding sub-band.

13. The invention of claim 12, wherein, for each band:

the modification function is a zero-mean random sequence within the band;

the coherence value is an average estimated coherence for the band; and the gain g is a function of the average estimated coherence.

14. The invention of claim 10, wherein the auditory scene parameter is a time difference.

15. The invention of claim 14, wherein, for each sub-band s in each band c, a time difference $\tau_s$ is modified based on a delay offset $d_s$ and a gain factor $g_c$ to generate a modified time difference $\tau_s'$ that is applied to generate left and right audio signals of an output audio signal, wherein:

$$\tau_s' = g_c d_s + \tau_s.$$

16. The invention of claim 15, wherein, for each band:

the delay offset $d_s$ is based on a zero-mean random sequence within the band;

the coherence value is an average estimated coherence for the band; and the gain $g_c$ is a function of the average estimated coherence.

17. The invention of claim 10, wherein the coherence value is estimated from left and right audio signals of an audio signal used to generate the input audio signal.

18. The invention of claim 17, wherein the estimate of coherence is a function of power estimates for the left and right audio signals.

19. The invention of claim 10, wherein, within each band, the auditory scene parameter is modified based on a random sequence.

20. The invention of claim 10, wherein, within each band, the auditory scene parameter is modified based on a sinusoidal function.

21. The invention of claim 10, wherein, within each band, the auditory scene parameter is modified based on a triangular function.

22. The invention of claim 10, wherein:

step (a) comprises the steps of:

(1) decoding an encoded audio bitstream to recover a mono audio signal; and (2) applying a time-frequency transform to convert the mono audio signal from a time domain into the plurality of sub-bands in a frequency domain;

step (b) comprises the steps of:

(1) applying the auditory scene parameter to each band to generate left and right audio signals of an output audio signal in the frequency domain; and (2) applying an inverse time-frequency transform to convert the left and right audio signals from the frequency domain into the time domain.

23. An apparatus for synthesizing an auditory scene, comprising:

(1) a time-frequency transformer configured to convert an input audio signal from a time domain into one or more frequency bands in a frequency domain, wherein each band comprises a plurality of sub-bands;

(2) an auditory scene synthesizer configured to apply an auditory scene parameter to each band to generate two or more output audio signals, wherein the auditory scene parameter is modified for each different sub-band in the band based on a coherence value, wherein the coherence value is related to perceived width of a synthesized audio source corresponding to the two or more output audio signals; and (3) one or more inverse time-frequency transformers configured to convert the two or more output audio signals from the frequency domain into the time domain.

24. The invention of claim 23, wherein the auditory scene parameter is a level difference.

25. The invention of claim 24, wherein, for each sub-band in each band, the level difference corresponds to left and right weighting factors $w_L$ and $w_R$ that are modified by factors $n_L$ and $n_R$, respectively, to generate left and right modified weighting factors $w_L'$ and $w_R'$ that are used to generate left and right audio signals of an output audio signal, wherein:

$$w'_L = w_L n_L;\ w'_R = w_R n_R$$

$$\frac{n_L}{n_R} = 10^{g r_{dB}/20}$$

$$(w_L n_L)^2 + (w_R n_R)^2 = 1$$

where g is a gain value for the corresponding band and $r_{dB}$ is a modification function value for the corresponding sub-band.

26. The invention of claim 25, wherein, for each band:

the modification function is a zero-mean random sequence within the band;

the coherence value is an average estimated coherence for the band; and the gain g is a function of the average estimated coherence.

27. The invention of claim 23, wherein the auditory scene parameter is a time difference.

28. The invention of claim 27, wherein, for each sub-band s in each band c, a time difference $\tau_s$ is modified based on a delay offset $d_s$ and a gain factor $g_c$ to generate a modified time difference $\tau_s'$ that is applied to generate left and right audio signals of an output audio signal, wherein:

$$\tau_s' = g_c d_s + \tau_s.$$

29. The invention of claim 28, wherein, for each band:

the delay offset $d_s$ is based on a zero-mean random sequence within the band;

the coherence value is an average estimated coherence for the band; and the gain $g_c$ is a function of the average estimated coherence.

30. The invention of claim 23, wherein the coherence value is estimated from left and right audio signals of an audio signal used to generate the input audio signal.

31. The invention of claim 30, wherein the estimate of coherence is a function of power estimates for the left and right audio signals.

32. The invention of claim 23, wherein, within each band, the auditory scene parameter is modified based on a random sequence.

33. The invention of claim 23, wherein, within each band, the auditory scene parameter is modified based on a sinusoidal function.

34. The invention of claim 23, wherein, within each band, the auditory scene parameter is modified based on a triangular function.

35. The invention of claim 23, wherein:

step (a) comprises the steps of:

(1) decoding an encoded audio bitstream to recover a mono audio signal; and (2) applying a time-frequency transform to convert the mono audio signal from a time domain into the plurality of sub-bands in a frequency domain;

step (b) comprises the steps of:

(1) applying the auditory scene parameter to each band to generate left and right audio signals of an output audio signal in the frequency domain; and (2) applying an inverse time-frequency transform to convert the left and right audio signals from the frequency domain into the time domain.

36. A method for processing two or more input audio signals, comprising the steps of:

(a) converting M input audio signals from a time domain into a frequency domain, where M>1;

(b) generating a set of one or more auditory scene parameters for each of one or more different frequency bands in the M converted input audio signals, where each set of one or more auditory scene parameters comprises an estimate of coherence between the M input audio signals, wherein the estimate of coherence is related to perceived width of an audio source corresponding to the M input audio signals; and (c) combining the M input audio signals to generate N combined audio signals, where M>N, wherein step (b) comprises the steps of:

(1) generating an estimated coherence between at least two input audio signals for one or more sub-bands; and (2) generating an average estimated coherence for one or more critical bands, wherein each critical band comprises one or more sub-bands.

37. The invention of claim 36, wherein:

step (a) comprises the step of applying a discrete Fourier transform (DFT) to convert the input audio signals from the time domain into a plurality of sub-bands in the frequency domain;

step (c) comprises the steps of:

(1) combining the input audio signals into at least one combined signal; and (2) encoding the combined signal to generate an encoded signal bitstream.

38. The invention of claim 36, wherein the average estimated coherence for each critical band is encoded with the N combined audio signals into an encoded signal bitstream.

39. A method for processing two or more input audio signals, comprising the steps of:

(a) converting M input audio signals from a time domain into a frequency domain, where M>1;

(b) generating a set of one or more auditory scene parameters for each of one or more different frequency bands in the M converted input audio signals, where each set of one or more auditory scene parameters comprises an estimate of coherence between the M input audio signals, wherein the estimate of coherence is related to perceived width of an audio source corresponding to the M input audio signals; and (c) combining the M input audio signals to generate N combined audio signals, where M>N, wherein the auditory scene parameters further comprise one or more of an inter-aural level difference (ILD), an inter-aural time difference (ITD), and a head-related transfer function (HRTF).

* * * * *